United States Patent [19]
Allen et al.

[11] Patent Number: 6,078,918
[45] Date of Patent: Jun. 20, 2000

[54] ONLINE PREDICTIVE MEMORY

[75] Inventors: Bradley P. Allen, Manhattan Beach; Jeffrey M. Greif, Venice; David L. Adam, San Francisco; John B. Jensen, Hermosa Beach; Michael W. Lo; Cormac Twomey, both of Marina Del Rey, all of Calif.

[73] Assignee: Trivada Corporation, Culver City, Calif.

[21] Appl. No.: 09/054,178

[22] Filed: Apr. 2, 1998

[51] Int. Cl.[7] .................................................. G06F 17/00
[52] U.S. Cl. .......................... 707/6; 707/5; 707/4; 706/23
[58] Field of Search .................. 707/1–206; 706/23–33; 187/391

[56] References Cited

U.S. PATENT DOCUMENTS

| | | | |
|---|---|---|---|
| 5,214,715 | 5/1993 | Carpenter et al. | 706/25 |
| 5,250,766 | 10/1993 | Hikita et al. | 187/391 |
| 5,774,633 | 6/1998 | Baba et al. | 706/25 |
| 5,845,052 | 12/1998 | Baba et al. | 706/33 |
| 5,943,662 | 8/1999 | Baba et al. | 706/23 |

OTHER PUBLICATIONS

Avi Silberschatz, et al., "A Belief–Driven Discovery Framework Based on Data Monitoring and Triggering," Dec. 1996.

Ronald J. Brachman, et al., "The Process of Knowledge Discovery in Databases: A Human–Centered Approach," Unpublished White Paper, 1997.

Kamal Ali, et al., "Partial Classification Using Association Rules," Proceedings of the 3$^{rd}$ Int'l Conf. On Knowledge Discovery in Databses, Aug. 1997.

Heikki Mannila, "Efficient Algorithms for Discovery of Association Rules," Proc. AAAI Workshop on Knowledge Discovery in Databases, Jul. 1994.

Rakesh Agrawal, et al., "Mining Association Rules Between Sets of Items in Large Databases," Proc. of the 1993 SIGMOD Conf., May 1993.

Arakesh Agrawal, et al., "Fast Algorithms for Mining Association Rules,"Proceedings of the 20$^{th}$ VLDB Conf., 1994.

Tom Mitchell, et al., "Experience with a Learning Personal Assistant," Communications of the ACM, Jul. 1994.

Avrim Blum, et al., "On–Line Algorithms in Machine Learning," Proc. Dagstuhl Workshop on On–Line Algorithms, Jun. 1996.

Mika Klemettinen, et al., "Finding Interesting Rules from Large Sets of Discovered Association Rules," Third Int'l Conf. On Information and Knowledge Management, Nov. 29–Dec. 2, 1994.

(List continued on next page.)

*Primary Examiner*—Thomas G. Black
*Assistant Examiner*—David Jung
*Attorney, Agent, or Firm*—Park & Vaughan LLP

[57] ABSTRACT

One embodiment of the present invention provides a system for making predictions about data records from an incoming stream of data records. This system operates by discovering predictive relationships in an online manner between fields in records in the incoming stream of data records as the incoming stream of data records is received. These predictive relationships can used to predict values in fields based on other field values in the same record. This facilitates cleansing of data by allowing transaction values to be validated based upon predictions made from other field values in the same transaction record. It also allows missing field values to be predicted based upon the other field values. A variation of this embodiment provides for filtering transaction records based upon discovered predictive relationships and routing the transaction records to other servers in real-time. Another embodiment forms association rules between fields in records in the incoming stream of records, and outputs these association rules for viewing by a human decision-maker. In another embodiment, the present invention comprises a server with an online predictive memory that can be incorporated into a heterogeneous network as a server. This embodiment is scalable and can be incorporated into an existing network with minimal integration effort. Note that the underlying model for this system continuously adapts to changes in the incoming stream of records over time without the need for any human intervention.

77 Claims, 8 Drawing Sheets

OTHER PUBLICATIONS

Nick Littlestone, et al., Comparing Several Linear Threshold Learning Algorithms on Tasks Involving Superfluous Attributes, Proc. $12^{th}$ Int'l Conf. On Machine Learning, Jul.1995.

Ido Dagan, et al., "Mistake Driven Learning in Text Categorization," Draft Report, Jan. 1997.

Andrew Golding, et al., "Applying Winnow to Context Sensitive Spelling Correction," Machine Learning: Proc. of the $13^{th}$ Int'l Conf., 1996.

Yoav Freund, "Sifting Informative Examples From a Random Source," Proc. Workshop on Relevance, AAAI–94 Fall Symposium Series, 1994.

Yezdi Lashkari, "Collaborative Interface Agents," Proc. of AIII '94 Conf., Aug. 1994.

Avrim Blum, "Empirical Support for Winnow and Weighted–Majority Algorithms: Results on a Calendar Scheduling Domain," Machine Learning, Proc. $12^{th}$ Int'l Conf., 1995.

Jeffrey C. Schlimmer, et al., "Software Agents: Completing Patterns and Constructing User Interfaces," Journal of Artificial Intelligence Research I (1993)61–893

Rakesh Agrawal, et al., "Active Data Mining," Proc. $1^{st}$ Int'l Conf. on Knowledge Discovery in Databases and Data Mining, 1995.

Henry Lieberman, "Attaching Interface Agent Software to Applications," Unpublished Draft, 1993.

Nicholas Littlestone, "Mistake Bounds on Logarithmic Linear–Threshold Learning Algorithms," Ph.D. Thesis, University of California at Santa Cruz, 1989.

Rakesh Agarwal, et al., "The Quest Data Mining System," Proc. of the $2^{nd}$ Int'l Conf. On Knowledge Discovery in Databases, Aug. 1996.

|                      |                       |
|----------------------|-----------------------|
| TRUE POSITIVES (INT) | FALSE POSITIVES (INT) |
| TRUE NEGATIVES (INT) | FALSE NEGATIVES (INT) |

500 CONFUSION MATRIX

| 0 | 1 | 0 | 1 | ⋯ |  |  |  |  | PREDICTED |
|---|---|---|---|---|--|--|--|--|-----------|
| 1 | 0 | 1 | 1 | ⋯ |  |  |  |  | CORRECT   |

TRAINING HISTORY 510

ONLINE PREDICTIVE MEMORY

BACKGROUND

1. Field of the Invention

The present invention relates to data management systems, and more particularly to a system that uses online learning techniques to make predictions about records in a stream of incoming data.

2. Related Art

Organizations today collect and process an ever-increasing amount of business transaction data. To handle this transaction data, an organization will often establish a "data warehouse" comprising data extracted from online transaction processing (OLTP) systems. This transaction data is typically aggregated from multiple sources and is greatly transformed prior to being stored in the data warehouse. Thus, maintaining a data warehouse involves labor-intensive and expensive preprocessing and offline manual preparation. Nonetheless, corporations spend billions of dollars annually to create these data repositories because of the extraordinary value of the information stored within them when used for purposes of business analysis and planning.

A number of tools are used by analysts to examine and analyze the information in a data warehouse in order to model business problems and plan future actions. Online Analytic Processing (OLAP) tools are used to confirm hypotheses about the data. Using the interactive querying and data manipulation capabilities of OLAP tools, an analyst can look at the data from multiple views. This allows the analyst to compare and contrast different slices of the data. For example, one query might retrieve the total sales dollars in each of five regions for the last three quarters, while a second query might focus on sales volumes for specific products. In short, OLAP tools simply provide automated support for the traditional tasks of a back-office business analyst.

In contrast to OLAP tools, which are used to confirm hypotheses, data mining systems are used to generate hypotheses. Data mining systems use various learning algorithms to discover relationships in data and to make predictions that are not apparent, or are too complex to be extracted through the use of statistical techniques. Data mining systems automate and assist statistical analysis by packaging one or more learning algorithms (e.g., neural networks, rule induction, and clustering) with a set of utilities for extracting data from a data warehouse. Using a data mining system, an analyst can, for example, generate rules and generalizations about data.

Analytical systems, such as OLAP tools and data mining systems presuppose the existence of a data warehouse. Hence, they suffer from two shortcomings of data warehouses: (1) loss of data detail and (2) delayed access to data. Loss of detail occurs because the data stored in a data warehouse is typically aggregated from multiple sources. During this aggregation process, valuable levels of detail in the raw data are lost. For example, daily variations in product sales are lost if the data in the warehouse is aggregated by month. The second shortcoming of data warehouses is the delayed access to the data. This arises because it takes time to process the raw transaction data prior to storing it in the data warehouse. The time required for processing can range from overnight to several weeks.

Systems that use stale warehouse data do not function well in today's rapidly changing business environment because, as the business environment changes, a plan that is based on an outdated internal model will not respond appropriately to changing market conditions. Consequently, the dynamic nature of today's business environment demands a way for business systems to react reflexively and adaptively to business events as they occur, at the detailed level of individual transactions. Hence, what are needed are analytic tools that can be used in real-time, in conjunction with OLTP systems.

Another use for collected (i.e., historical) data is in data prediction. For example, historical data can be used to predict missing data values. As with the above-described traditional system models, traditional data prediction systems suffer from the use of stale data. These data prediction systems are typically trained offline, in batch mode, using only historical data. Consequently, these systems make predictions about incoming, new data using a prediction model that is based on older data that may no longer be representative of current incoming data.

FIG. 1 illustrates a traditional data processing system including OLAP tools 114 and data mining system 118. In the illustrated system, client computer systems 102, 104 and 106 communicate with application server 108. These communications include data input from client computer systems 102, 104 and 106. These communications are processed by application server 108 and are formatted for storage in transactional database 110. Client computer systems 102, 104 and 106 can additionally communicate directly with transactional database 110. This communication pathway is illustrated with the dashed lines. From transactional database 110, the data is subjected to a number of processes, such as extraction, transformation, aggregation and cleansing before it is placed in data warehouse 116.

From data warehouse 116, the data can be processed in a number of ways. First, it can be directly formatted from data warehouse 116 to produce reports 130. Second, it can be processed through OLAP tools into reports 126. As illustrated, this process does not occur automatically; it must be manually performed by an operator 120. Finally, it can be processed through a data mining system 118 into reports 128 and into a model database 124. Again, this process must be manually performed by an operator 122. Not shown explicitly in FIG. 1 is the communication network, or group of networks that couple together and facilitate communication between the various components of the system.

Another approach to building data prediction systems is rooted in academic work by the computational learning theory community in the area of "online learning." Online learning takes place in a sequence of trials. In each trial, a data record is presented to a learner, whose goal is to accurately predict whether or not the given data record has a specific property. The learner makes a prediction about whether the data record has the property, and then receives feedback about whether the prediction was correct. This feedback is used to update a model that the learner uses to make subsequent predictions. In an online learning system, there is no distinction between training and testing, since both occur within a given trial.

One online learning algorithm, called Winnow, was described by Nicholas Littlestone of UC Santa Cruz. See "Mistake Bounds and Logarithmic Linear-Threshold Learning Algorithms," by Nicholas Littlestone, a Ph.D. Dissertation from the University of California at Santa Cruz, 1989. Winnow has been shown to learn efficiently any linear threshold function. Linear threshold functions are an important class of knowledge representation, and they have long been used to represent a wide range of concepts in learning systems, including Boolean disjunctions and conjunctions of features.

Winnow's design was also based on the mistake bound model of learning. The mistake bound model of learning is an approach to the formal mathematical analysis of the worst-case behavior of a learning algorithm. In this model, it is assumed that the learner's goal is to make as few mistaken predictions as possible. Further, it is assumed that the presentation of examples to the learner is under the control of an adversary, whose goal is to select a sequence of trials in a way that maximizes the number of mistakes made by the learner. Using the mistake-bound model, one can prove upper and lower bounds on the number of mistakes made by a learner in the worst case.

The key aspect of Winnow, and similar algorithms, is that their mistake bounds grow linearly with the number of relevant features, but grow only logarithmically with the total number of features. All field/value pairs in a data record are features, while only the subset of field/value pairs that proves to be pertinent to the prediction undertaken are relevant features. Therefore, the total number of features is the total number of field/value pairs in the incoming data record, while the number of relevant features is the smaller number of field/value pairs in the subset.

Winnow has been analyzed in the presence of various kinds of noise, as well as in cases where no linear-threshold function can make perfect classifications. It has been proven, under some assumptions on the type of noise, that Winnow still learns as well as the best linear threshold function could learn, while retaining its dependence on the number of total and relevant features. In contrast to Bayesian approaches, the algorithm makes no independence assumptions, or any other assumptions, about the attributes.

Winnow is a mistake-driven algorithm; that is, it updates its model only when a mistake is made, and it only updates those parts of the model directly involved in making the mistake. This leads to significant implementation efficiencies compared with implementations of previous approaches to learning linear-threshold functions. Further, Winnow is a multiplicative-update algorithm; that is, the method used to update its state when a mistake has been made involves multiplication. This is an important factor in both the formal analysis of the algorithm and the algorithm's ability to learn to ignore irrelevant features quickly.

Theoretical analyses of the Winnow family of algorithms have predicted an excellent ability to deal with large numbers of features and to adapt to new trends. This extremely good learning behavior in high-dimensional feature spaces and in the presence of irrelevant features, is an important property that allows one to separate the learning problem from that of selecting the features. Therefore, a large set of features can be used and the algorithm will eventually discard those that do not contribute to the accuracy of the resulting set of predictions. This removes one of the major burdens associated with data preparation in an OLAP or data mining effort: the user is freed from the need to select relevant features in advance.

Although systems such as Winnow can "learn" linear threshold functions and the like, this learning takes place by updating numerical weights that are used to produce a functional output. One disadvantage of this type of learning is that the numerical weight values are not very meaningful to human decision-makers. Human decision-makers are better suited to understand association rules such as, "computer systems ordered with a 300 MHz processor and a 17-inch monitor have a 70% probability of including 64 megabytes of memory."

Hence, what is needed is an online learning system that identifies association rules between fields in incoming data records. For example, this type of association rule might say that a first value in a first field of a data record is predictive of a second value in a second field of the data record.

SUMMARY

One embodiment of the present invention provides a system for making predictions about data records from an incoming stream of data records. This system operates by discovering predictive relationships between fields in records in the incoming stream of data records in an online manner as the incoming stream of data records is received. These predictive relationships can be used to predict values in fields in a new data record based on other field values in the new data record. This facilitates cleansing of data by allowing transaction values to be validated based upon predictions made from other field values in the same transaction record. It also allows missing field values to be predicted based upon the other field values. A variation of this embodiment provides for filtering transaction records based upon discovered predictive relationships and routing the transaction records to other servers in real-time. Another embodiment forms association rules between fields in records in the incoming stream of records, and outputs these association rules for viewing by a human decision-maker. In another embodiment, the present invention comprises a server with an online predictive memory that can be incorporated into a heterogeneous network as a server. This embodiment is scalable and can be incorporated into an existing network with minimal integration effort. Note that the underlying model for this system continuously adapts to changes in the incoming stream of records over time without the need for any human intervention.

Moreover, unlike conventional online learning systems that "learn" by updating numerical weights, one embodiment of the present invention learns by forming association rules. These association rules specify that particular values in particular input fields are predictive of particular values occurring in particular output fields. This information enables human decision-makers to understand and act upon the association rules discovered by the present invention.

Incorporating online learning algorithms into applications, such as business modeling systems, can provide a new capability, referred to as "predictive data management," in which historical data is used automatically to predict data values in current transactions. Such predictive data management systems incorporate the advantages of online learning algorithms and provide numerous benefits over traditional transaction data prediction systems including:

Predictability: by virtue of the thorough formal analysis of the class of online learning algorithms, their time and space behavior is much better understood than that of traditional approaches.

Scalability: these algorithms lend themselves to implementations that are much more efficient in time and space than traditional approaches.

Adaptivity: these algorithms can track changes in the data indefinitely, whereas traditional offline approaches require periodic retraining and redeployment.

Immediacy: results can be obtained at any point during processing.

Robustness: these algorithms quickly learn to ignore noise and irrelevant features in the data.

Ease of use: eliminates much of the burden of feature selection in data preparation.

Real-time systems incorporating online learning can overcome the deficiencies inherent in the traditional data discovery and data prediction systems discussed above. First, such real-time systems can process production transaction data streams, and therefore, do not suffer from the shortcomings of data discovery systems that process warehouse data, namely loss of data detail and delayed access to data. Second, such real-time systems can generate predictions more accurately and more efficiently than traditional data prediction systems, because the most current transaction data is used in the prediction learning process. Third, efficiency is improved because there is no need to select relevant features in advance, as required in traditional OLAP tools and data mining systems. As a result, a system incorporating online learning algorithms, operating within the context of OLTP, can detect trends and patterns in transaction data, in real-time, optionally using those patterns to provide real-time prediction services.

DEFINITIONS

Association Rule—a rule that can be readily understood by a human, that associates at least one value occurring in at least one field of a data record (the "input field") with a value occurring in another field of the data record (the "output field"). For example, an association rule can state that "a first value occurring in a first field is predictive of a second value occurring in a second field in a data record."

Online Learning—Learning that takes place in a sequence of trials in which a data record is presented to a learning mechanism, whose goal is to accurately predict whether or not the given data record has a specific property. The learning mechanism makes a prediction about whether the data record has the property, and then receives feedback about whether the prediction was correct. This feedback is used to update a model that the learner uses to make subsequent predictions.

Predictive Relationship—a relationship that allows an output field in a data record to be predicted based upon at least one value occurring in at least one input field of the data record. For example, a predictive relationship may specify a set of numerical weights relating the occurrence of particular values occurring in particular input fields with a particular value occurring in a particular output field.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. For example, many of the components and operations described below can be implemented using computer hardware, or alternatively, using computer software.

Description of Computing System

Figure 1:
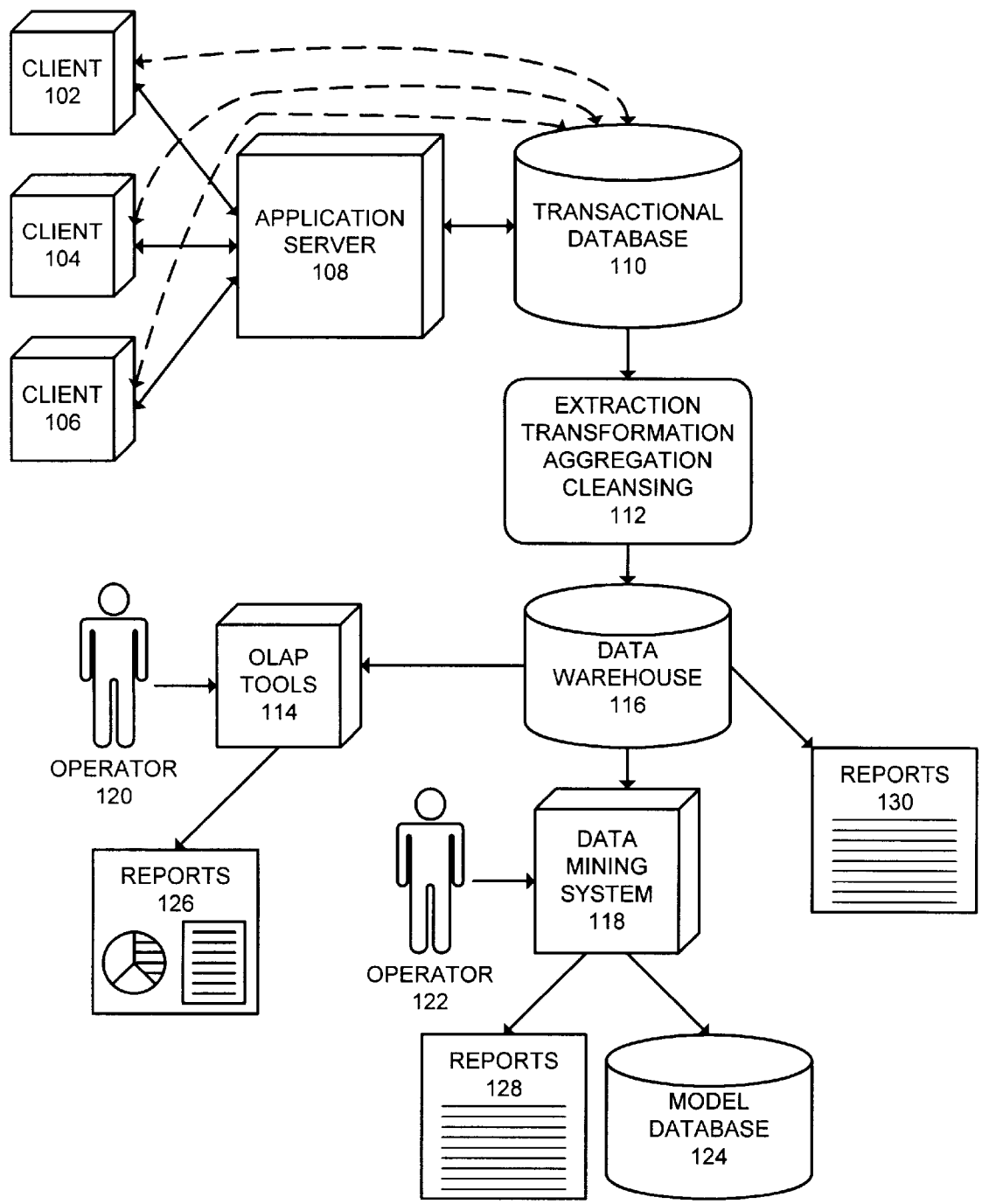
FIG. 1 illustrates a traditional data processing system including OLAP tools 114 and a data mining system 118.
Figure 2:
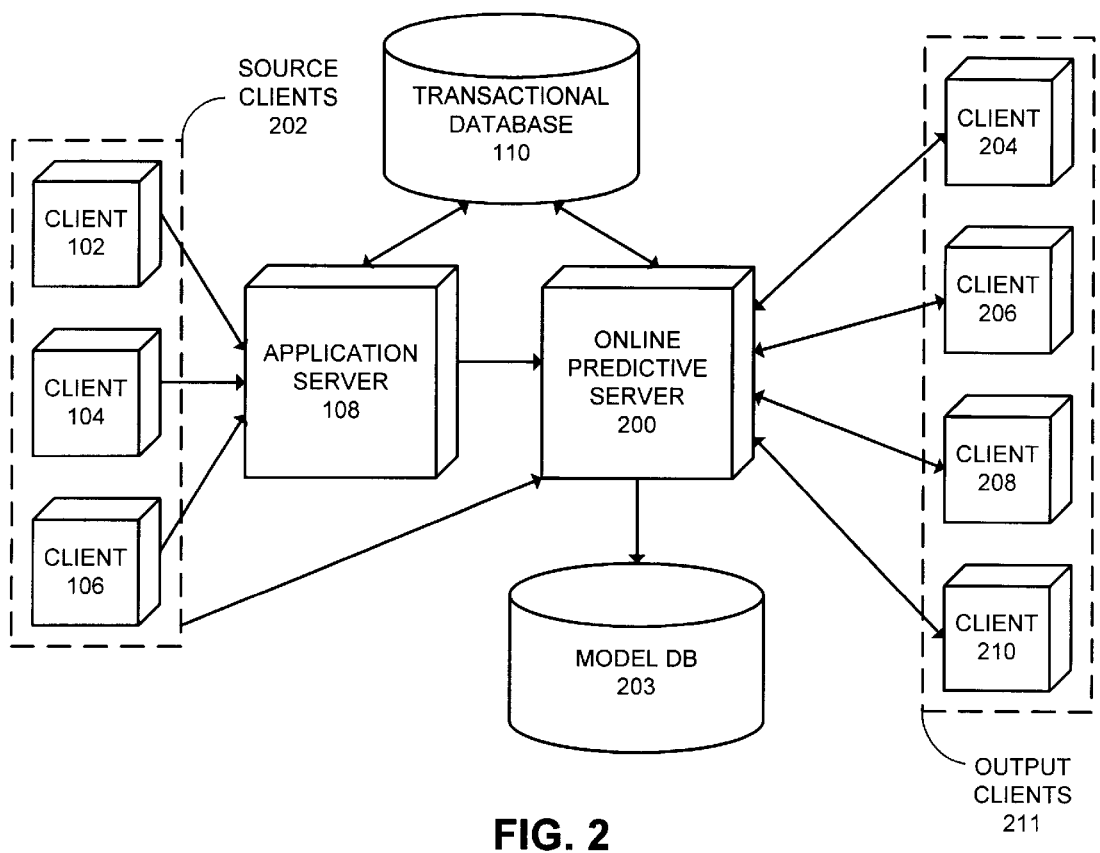
FIG. 2 illustrates a computing system including online predictive server (OP server) 200 in accordance with an aspect of the present invention.

FIG. 2 illustrates a computing system including an online predictive server (OP server) 200 in accordance with an embodiment of the present invention. FIG. 2 illustrates a number of source clients 202, including clients 102, 104 and 106, coupled to application server 108. Not shown in FIG. 2 are the communication channels used to couple together the illustrated system components. These communication channels may include local area networks, wide area networks, or any other mechanism through which computer systems and computer system components can communicate. Application server 108 may include any type of computer system containing data storage or computational resources for use by source clients 202. In one embodiment, application server 108 includes a web site server that communicates with source clients 202 over the Internet. In another embodiment, application server 108 includes business-processing logic for processing transactions related to business applications. In yet another embodiment, application server 108 includes a transaction processing monitor system that monitors records in a transaction processing system. In a further embodiment, application server 108 includes an order entry system.

Application server 108 is coupled to transactional database 110, which stores records for transactions processed through application server 108. Transactional database 110 can be any type of database system capable of processing and storing transaction records. This can include, but is not limited to, a hierarchical database system, a relational database system, or an object-relational database system. Application server 108 is additionally coupled to OP server 200.

OP server 200 includes computational and data storage resources for discovering predictive relationships and learning association rules in an online manner from an incoming stream of data records as it is received. OP server 200 can receive data records from a number of sources as is illustrated in FIG. 2. Records can be received from application server 108, or directly from source clients 202 in raw, unprocessed form. Records can additionally be received from transactional database 110 after they have been processed by application server 108. OP server 200 is additionally coupled to model database 203. Model database 203 stores a continually updated model of predictive relationships and association rules between fields in database records. In one embodiment, model database 203 includes a discovery log, which is a record of the discovered predictive relationships and association rules between fields in incoming database records.

OP server 200 is additionally coupled with output clients 211, including clients 204, 206, 208, and 210. Output clients 211 can access predictive relationships and association rules from OP server 200. They can use these rules and relationships for a number of functions. Output clients 211 can use the association rules to generate reports for human decision-makers. Additionally, output clients 211 can use the predictive relationships to facilitate cleansing of data by allowing transaction values to be validated based upon other field values in the same transaction record. They can also use the predictive relationships to predict missing field values in records based upon other field values in the same record. Or, they can filter transaction records based upon the discovered predictive relationships and to route the transaction records to other servers.

FIG. 2 illustrates output clients 210 and source clients 202 as being separate computing systems. However, in another embodiment, output clients 210 and source clients 202 reside on the same computer systems. In this embodiment, the clients both send input records to and retrieve predictive relationships and association rules from OP server 200.

The system illustrated in FIG. 2 generally operates as follows. Source clients 202 communicate with application server 108 to generate a stream of incoming records. These records generally feed into OP server 200, but they may also be stored in transactional database 110. As mentioned above, OP server 200 may additionally receive records from source clients 202 directly, or OP server 200 may receive stored records from transactional database 110.

OP server 200 uses the incoming stream of data records to learn a set of predictive relationships in an online manner. These predictive relationships are used to make predictions for values in fields in an incoming record based upon the values of other fields in the same record. The predictive relationships can be used to facilitate cleansing of data by allowing transaction values to be validated based upon other field values in the same transaction record. These predictive relationships may also be used to predict missing field values in records based upon other field values in the same record. Additionally, these predictive relationships can also be used to filter transaction records based upon discovered association rules and to route the transaction records to other servers.

OP server 200 also uses the incoming stream of data records to discover association rules in an online manner. Output clients 210 access the association rules discovered by OP server 200 and use these association rules to generate reports for human decision-makers. (As mentioned above, output clients 210 may reside on the same computer systems as source clients 202.) These association rules can also be used to construct a model for a business process, which is stored within model database 203.

Description of OP Server Communication Pathways

Figure 3:
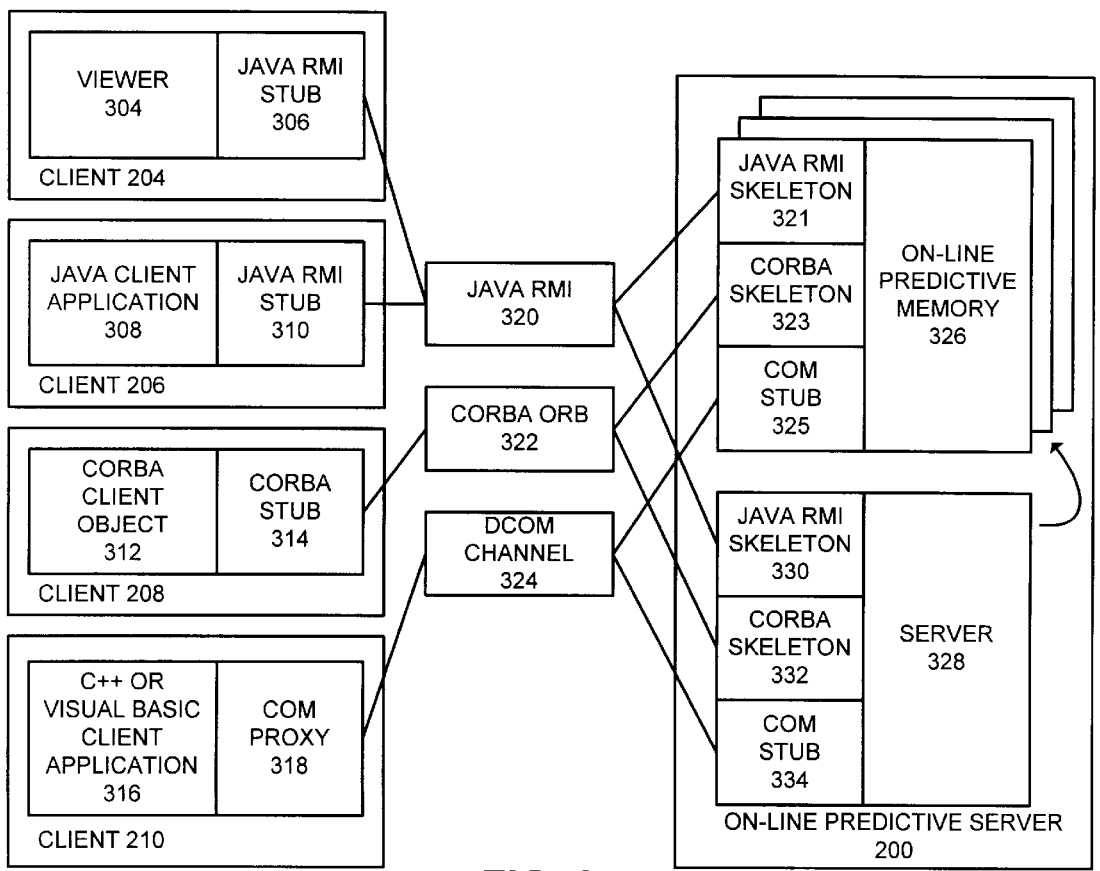
FIG. 3 illustrates communication pathways between the output clients and the OPM of FIG. 2 in accordance with an aspect of the present invention.

FIG. 3 illustrates a number of possible communication pathways between clients 204, 206, 208, 210 and OP server 200 (from FIG. 2) in accordance with an embodiment of the present invention. In this embodiment, OP server 200 is embedded within a distributed object framework. OP server 200 includes a mechanism for creating and registering online prediction memories as distributed objects accessible over a number of architectures, such as Distributed Common Object Model (DCOM), Java Remote Method Invocation (Java RMI) and Common Object Request Broker Architecture (CORBA). To this end, FIG. 3 illustrates clients 204, 206, 208 and 210 coupled to OP server 200 through three different communication channels, including Java RMI channel 320, CORBA ORB channel 322, and DCOM channel 324. Client 204 includes viewer 304 and Java RMI stub 306, which communicates with OP server 200 through Java RMI channel 320. Client 206 includes Java client application 308 and Java RMI stub 310, which also communicates with OP server 200 through Java RMI channel 320. Client 208 includes CORBA client object 312 and CORBA stub 314, which communicates with OP server 200 through CORBA ORB channel 322. Client 210 includes a C++ or Visual Basic application 316 and COM proxy 318, which communicates with OP server 200 through DCOM channel 324.

In this embodiment, OP server 200 includes online predictive memory (OPM) 326 and server 328. OPM 326 implements an online predictive memory. Server 328 performs server functions for OPM 326 and can additionally perform other server functions. As used herein, OPM 326 may be understood to include a plurality of online predictive memory modules allowing OP server 200 to service a number of different applications simultaneously.

OPM 326 is accessible through the above-mentioned communication pathways. More particularly, OPM 326 includes Java RMI skeleton 321, which allows OPM 326 to communicate with clients 204 and 206 through Java RMI channel 320. OPM 326 also includes CORBA skeleton 323, which allows OPM 326 to communicate with client 208 through CORBA ORB channel 322. OPM 326 additionally includes COM stub 325, which allows OPM 326 to communicate with client 210 through DCOM channel 324.

Similarly, server 328 includes analogous structures for communicating with clients 204, 206, 208 and 210. More specifically, server 328 includes Java RMI skeleton 330, which allows server 328 to communicate with clients 204 and 206 through Java RMI channel 320. Server 328 also includes CORBA skeleton 332, which allows server 328 to communicate with client 208 through CORBA ORB channel 322. Server 328 additionally includes COM stub 334, which allows server 328 to communicate with client 210 through DCOM channel 324.

The above-described communication structures within OP server 200 allow OP server 200 to communicate with clients through multiple protocols. This facilitates using the present invention with a variety of different client systems.

Description of Online Predictive Server Components

Figure 4A:
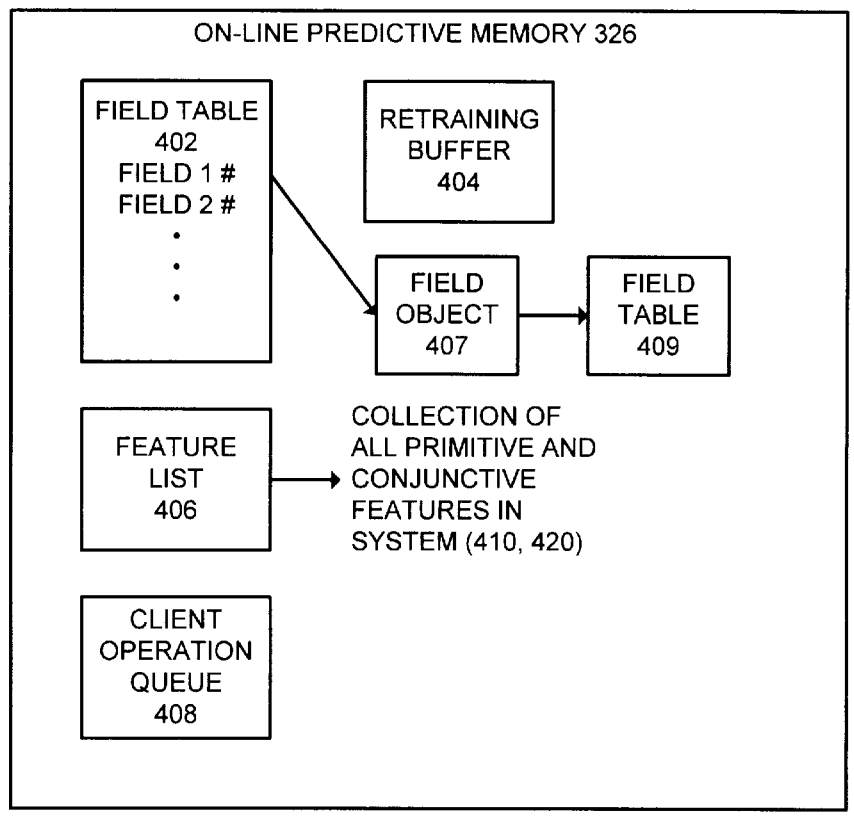
FIG. 4A illustrates part of the internal structure of the online predictive memory (OPM) of FIG. 3 in accordance with an aspect of the present invention.

FIG. 4A illustrates part of the internal structure of OPM 326 (from FIG. 3) in accordance with an embodiment of the present invention. In this embodiment, OPM 326 includes field table 402, retraining buffer 404, feature list 406 and client operation queue 408. Each record in an incoming stream of records includes a plurality of fields containing values. Fields may be categorized as input fields, output fields or bi-directional fields. An input field is used to make predictions for output fields. Hence, input fields are effectively inputs to a prediction system. Correspondingly, output fields are associated with outputs of the prediction system. Bi-directional fields are associated with both inputs and outputs of the prediction mechanism. Each field-value pair is referred to as a "feature," which associates the value with the field.

Field table 402 is a table indexed by field name that includes a plurality of pointers to field objects. These field objects can be used to reference associated features. Each field object is associated with its own feature table including features associated with the field. For example, in FIG. 4A, field table 402 points to field object 407, which references its own feature table 409.

Feature list 406 contains a list that can be used to index all of the primitive and conjunctive features associated with OPM 326. A primitive feature is simply a single field-value association, whereas a conjunctive feature comprises a plurality of primitive features. Conjunctive features can be used to create association rules wherein multiple primitive input features are predictive of a particular output feature. For example, the fact that a customer orders 300 MHz processor and a 17-inch monitor in a computer system may be predictive of the customer ordering 64 megabytes of memory in the computer system. In this case, the processor speed field containing 300 MHz (primitive feature) and the monitor size field containing 17 inches (primitive feature) is a conjunctive feature that is predictive of the memory size field containing 64 megabytes. Feature list 406 provides a convenient indexing structure through which the system can cycle through all of its features. As discussed previously, each field object additionally includes its own feature table including features associated with the field.

Retraining buffer 404 contains a collection of previous records from the incoming stream of records. Retraining buffer 404 is used to train the system in the background, during time intervals when no records are entering the system. This retraining process can improve the convergence rate of the learning mechanism, by allowing the learning mechanism to continue to learn even if no new records are entering the system.

Client operation queue 408 includes mechanisms for managing tasks performed on behalf of clients. This includes locks for synchronizing client operations.

Figure 4B:
FIG. 4B illustrates part of the structure of a primitive feature in accordance with an aspect of the present invention.

FIG. 4B illustrates part of the structure of a primitive feature 410 in accordance with an embodiment of the present invention. Primitive feature 410 references a list of conjunctive features containing that primitive feature. If primitive feature 410 is an input feature, primitive feature 410 additionally references a table of weights associated with the primitive feature 410. These weights represent the contribution of the input feature towards predicting specified output features.

Primitive feature 410 additionally references a rule structure. The rule structure contains data associated with rules. A rule takes the form of a human readable implication, such as, "a first value in a first field implies a second value in a second field." The rule structure additionally comprises data structures to keep track of the strength of a particular rule and the accuracy of the particular rule in making predictions.

If primitive feature 410 is an output feature, it references an associated confusion matrix and training history, which are described in more detail below with reference to FIGS. 5A and 5B.

Figure 4C:
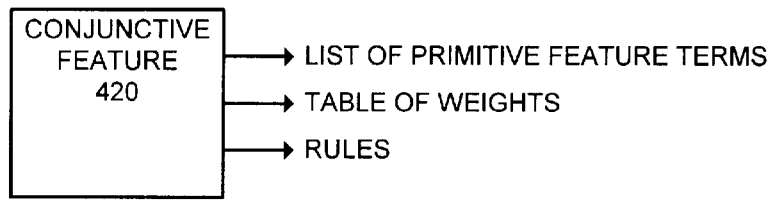
FIG. 4C illustrates part of the structure of a conjunctive feature in accordance with an aspect of the present invention.

FIG. 4C illustrates part of the structure of conjunctive feature 420 in accordance with an embodiment of the present invention. Conjunctive feature 420 includes a reference to a list of primitive features that make up the conjunctive feature. As in the case of a primitive feature, conjunctive feature 420 additionally references a table of weights associated with conjunctive feature 420. Conjunctive feature 420 also references a rule structure. The rule structure contains data associated with the rule, and is much like the rule structure described above for primitive features. Note that in this embodiment of the present invention, conjunctive features are input features.

Description of Data Structures for Statistics

Figures 5A, 5B, 5C:
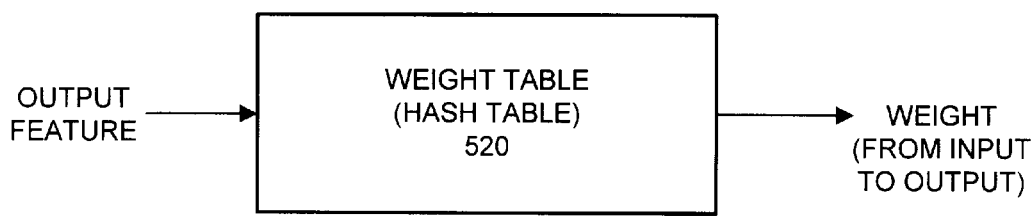
FIG. 5A illustrates part of the structure of a confusion matrix in accordance with an aspect of the present invention.
FIG. 5B illustrates part of the structure of a training history data structure in accordance with an aspect of the present invention.
FIG. 5C illustrates part of the structure of a weight table in accordance with an aspect of the present invention.

FIG. 5A illustrates part of the structure of confusion matrix 500 in accordance with an embodiment of the present invention. Confusion matrix 500 keeps statistics on how accurately a particular output feature is predicted, by summing the relative contributions of all input features to the output feature, and determining whether the input features sum above a threshold value. The contribution of a particular input feature to a particular output feature is determined by a feature weight. For example, in predicting if an output feature is present in a given record, the system first examines all input features within the record. For each of the input features in the record, the system retrieves the related weight. The system then sums all of the related weights, and the if the result is above a particular threshold, the system predicts the output feature. (In another embodiment, the summing process includes summing the weights multiplied their corresponding field values.)

Confusion matrix 500 keeps track of how well this prediction process works for each output feature. In doing so, confusion matrix 500 keeps track of the number of true positive predictions, the number of false positive predictions, the number of false negative predictions, and the number of true negative predictions. In this embodiment, these numbers are stored as integers. The number of false positive predictions is the number of predictions that the system determined would be positive that turned out to be negative. The number of true positive predictions is the number of predictions that the system determined would be positive that turned out to be positive. Correspondingly, the number of false negative predictions is the number of predictions that the system determined would be negative that turned out to be positive, and the number of true negative predictions is the number of predictions that the system determined would be negative that turned out to be negative. The confusion matrix need not store the number of true negative predictions, because the number of true negative predictions can be determined from the total number of predictions and the three other values. By examining the number of false positive and false negative predictions, confusion matrix 500 can indicate how well a particular output feature is being predicted.

FIG. 5B illustrates part of the structure of training history 510 in accordance with an embodiment of the present invention. Training history 510 keeps track of the recent performance of the prediction mechanism for the output feature by maintaining two bit vectors. One bit vector keeps track of the most recent predictions made specifying the output feature. A single bit in this vector indicates whether a particular prediction was negative or positive. The other bit vector keeps track of whether or not the prediction was correct.

FIG. 5C illustrates part of the structure of weight table 520 in accordance with an embodiment of the present invention. Recall that a separate weight table, such as weight table 520, exists for each input feature. Weight table 520 is indexed by output feature in order to facilitate looking up a weight for a particular output feature. This weight indicates an amount of influence that a particular input feature has in predicting a particular output feature. In the illustrated embodiment, weight table 520 is implemented as a hash table to perform quick lookups of weights. However, any indexing structure that facilitates such lookups can be used.

Description of Training Process

Figure 6:
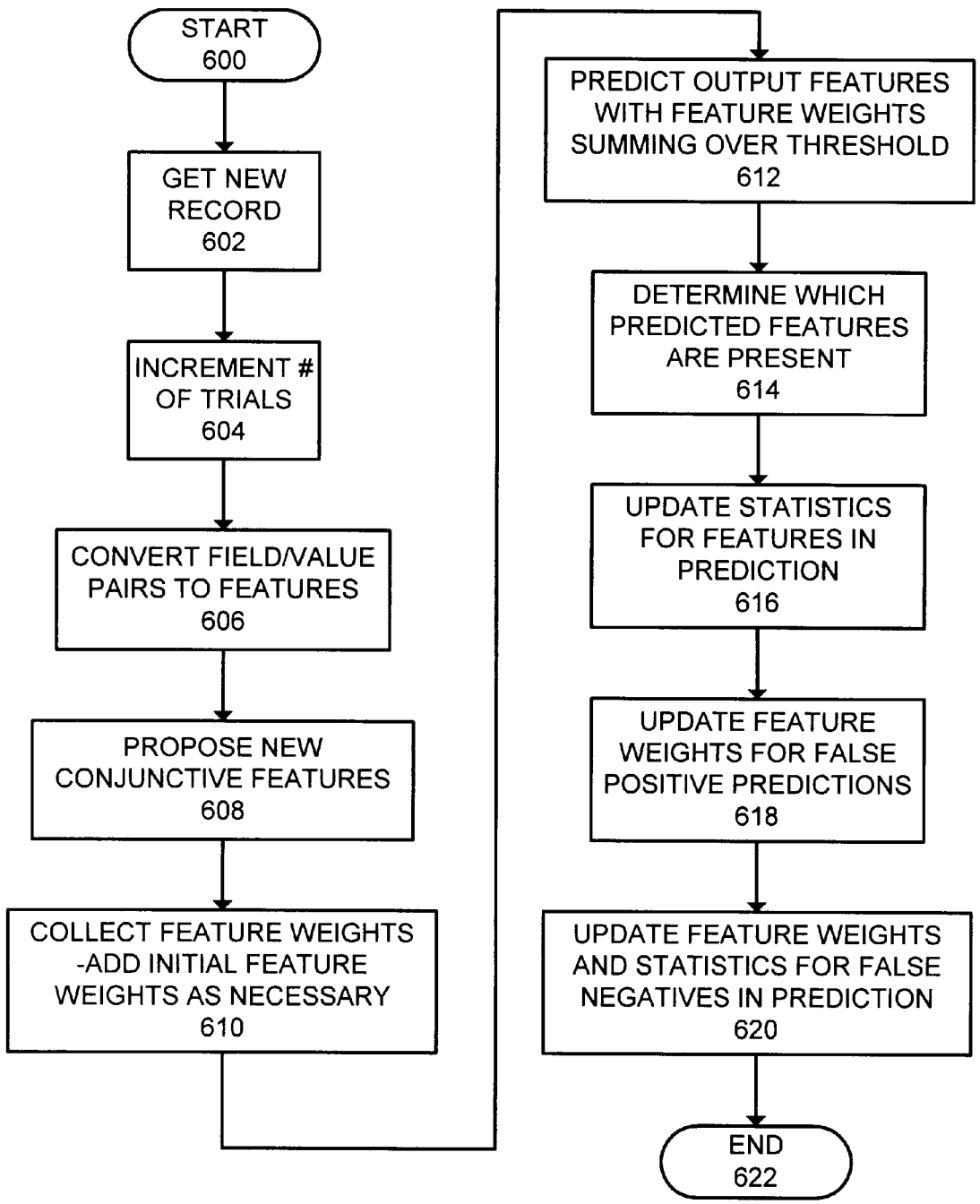
FIG. 6 is a flow chart illustrating some of the operations involved in training the predictive learning mechanism in accordance with an aspect of the present invention.

FIG. 6 is a flow chart illustrating some of the operations involved in training the predictive learning mechanism in accordance with an embodiment of the present invention. The system starts in state 600 and proceeds to state 602. In state 602, the system gets a new record from the incoming stream of records. As mentioned above, the new records can originate from a client system, an application server, or a transactional database. The system next proceeds to state 604. In state 604, the system increments a variable containing the number of trials. The system next proceeds to state 606. In state 606, the system examines the retrieved record and formats field/value pairs into features, which are data structures representing field/value pairs. The system next proceeds to state 608. In state 608, the system selects new conjunctive features as good predictors. In doing so, the system examines the conjunctive features occurring in the retrieved record, and selects new conjunctive features to include in the system based upon certain criteria, such as whether primitive features that make up the conjunctive feature occur frequently enough to be of interest. The system next proceeds to state 610. In state 610, the system collects feature weights. The system does this by scanning through each input or bi-directional feature and collecting weights from the feature's associated weight table, such as weight table 520. If a feature occurs for the first time, the system adds a default initial weight value for the feature. The system next proceeds to state 612. In state 612, the system considers each output feature. For each output feature, the system sums the feature weights, and determines if the feature weights sum over a particular threshold value. If so, the system predicts the output feature. The system next proceeds to state 614.

In state 614, the system determines which output features are actually present in the retrieved record by scanning through the retrieved record. The system then proceeds to state 616. In state 616, the system updates statistics for features that have been predicted and are actually present in the retrieved record—true positive predictions. In one embodiment, updating these statistics include updating confusion matrix 500 and training history 510. The system next proceeds to state 618. In state 618, the system updates feature weights for inputs that contributed to false positive predictions. The feature weights can be updated in a number of ways. In one embodiment, feature weights that contributed to the false positive prediction are diminished, because a feature was predicted when it should not have been. Correspondingly, the feature weights that contributed to a false negative prediction are increased because the output feature should have been predicted, but was not. Hence, any weights contributing to the prediction of the feature should be increased. In one embodiment of the present invention, the updating process is multiplicative. This tends to magnify the effect of weight updates, causing the system to learn more quickly. In this embodiment, the updating of weights occurs on false predictions only; this includes false negative or false positive predictions. The system next proceeds to state 620. In state 620, the system updates feature weights and statistics for false negative predictions. The system next proceeds to state 622, which is an end state. At this point the training process is complete until the next record is received. Note that true negative predictions can be ignored. This increases efficiency because true negative predictions occur so often, that updating statistics or weights for true negative predictions would consume an inordinate amount of computing power.

In one embodiment of the present invention, the system trains on a subset of the input records that are received. This is done for purposes of computational efficiency, so as not to overly burden OP server 200 with training, while input records stream in at a high rate. This is also done to balance the rate of creation of rules, features and weights with the rate of destruction (pruning) as is described below.

Description of Prediction Process

Figure 7:
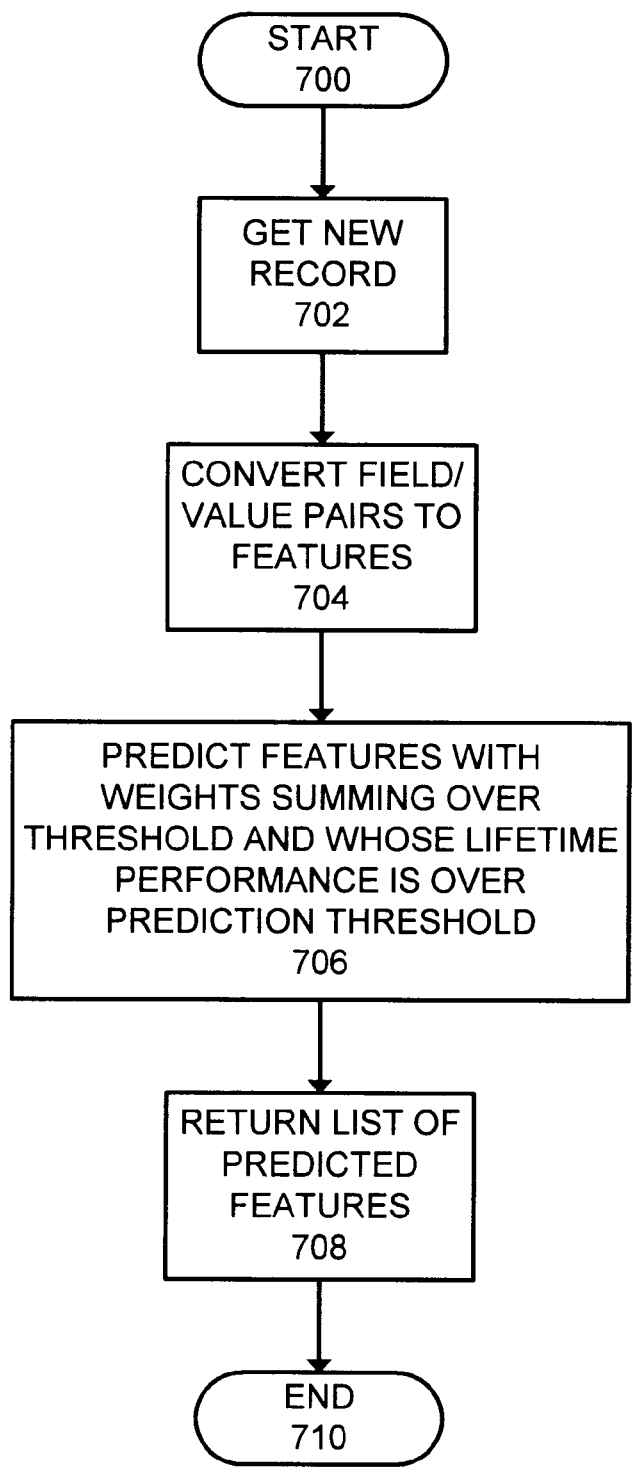
FIG. 7 is a flow chart illustrating some of the operations involved in predicting features in accordance with an aspect of the present invention.

FIG. 7 is a flow chart illustrating some of the operations involved in predicting features using the predictive learning mechanism trained previously in accordance with an embodiment of the present invention. The prediction process is considerably simpler than the training process, because no updating of complex data structures is required. The system starts in state 700 and proceeds to state 702. In state 702, the system gets a new record from any of the sources discussed above. The system next proceeds to state 704. In state 704, the system converts field-value pairs into features. This is analogous to the process outlined in FIG. 6 at state 606. The system next proceeds to state 706. In state 706, the system predicts output features by summing weights relating input features to output features and determining which summations exceed a prediction threshold. These features are examined to determine which output features have good prediction performance. This can be determined by examining confusion matrix 500 and training history 510. If the prediction performance of the feature has been above a threshold percentage, the feature is predicted. The system next proceeds to state 708. In state 708, the system returns a list of predicted features. The system next proceeds to state 710, which is an end state.

FIG. 7 does not illustrate what the system does with the predicted features. These predicted features can be used to facilitate cleansing of data by allowing transaction values to be validated based upon other field values in the same transaction record. They can also be used to predict missing field values based upon the other field values.

Description of Rule and Predictive Relationship Evaluation Process

Figure 8:
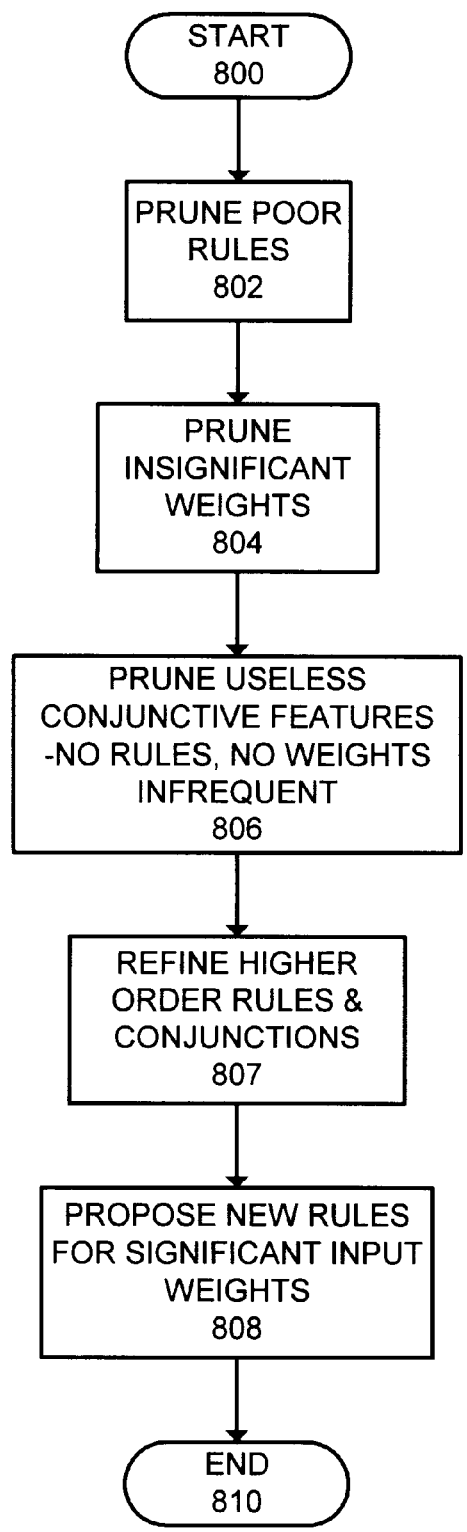
FIG. 8 is a flow chart illustrating some of the operations involved in pruning away poor predictors in accordance with an aspect of the present invention.

FIG. 8 is a flow chart illustrating some of the operations involved in pruning away poor predictors in accordance with an embodiment of the present invention. The following process is repeated periodically in order to optimize system performance. The system starts at state 800 and proceeds to state 802. In state 802, the system prunes poor rules. Poor rules are rules that fall below a certain threshold for accurately predicting output features. The system next proceeds to state 804. In state 804, the system prunes insignificant weights. These are weights that have been reduced through the updating process to the point where they do not contribute significantly in making predictions. The system next proceeds to state 806. In state 806, the system prunes useless conjunctive features. These are conjunctive features for which there are no rules, for which there are no weights, or that occur so infrequently that they are not of significant interest, even if they yield accurate predictions.

By periodically pruning away useless rules, weights, and conjunctive features, the system can limit the number of data items that must be searched in order to perform a prediction. In the ideal case, pruning of rules weights and features occurs frequently enough to balance the creation rate of rules, weights and features.

The system next proceeds to state 807. In state 807, the system refines higher order rules and conjunctions. These are rules and conjunctions that involve numerous primitive feature terms. It does so by evaluating the performance of rules involving higher order conjunctive features in order to adjust corresponding higher order weights and rules. The system next proceeds to state 808. In state 808, the system proposes new rules. This is accomplished by identifying significant input weights, and forming new rules based upon these input weights. The new rules can be based upon both primitive features and conjunctive features. The system next proceeds to state 810, which is an end state.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

What is claimed is:

1. A method for making online predictions about data records from an incoming stream of data records, comprising:

receiving, at a computer system, the incoming stream of data records;

learning a predictive relationship between fields in the incoming stream of data records in an online manner as the incoming stream of data records is received;

examining at least one value from at least one input field of a first data record in the incoming stream of data records; and creating a predicted value for an output field in the first data record using the at least one value and the predictive relationship.

2. The method of claim 1, further comprising discovering an association rule between fields in the incoming stream of data records in an online manner.

3. The method of claim 2, further comprising outputting the association rule for viewing by a human decision-maker.

4. The method of claim 2, wherein discovering the association rule includes discovering that a first value occurring in a first field is predictive of a second value occurring in a second field in a data record in the incoming stream of data records.

5. The method of claim 2, wherein discovering the association rule includes discovering that a first value occurring in a first field and a second value occurring in a second field is predictive of a third value occurring in a third field in data records in the incoming stream of data records.

6. The method of claim 2, wherein discovering the association rule includes sampling a subset of records in the incoming stream of data records in order to discover the association rule.

7. The method of claim 2, further comprising removing association rules having a history of making poor predictions.

8. The method of claim 2, further comprising removing infrequently used association rules.

9. The method of claim 1, wherein creating the predicted value for the output field includes summing at least one weight relating the predicted value to the at least one input field value from the at least one input field, and determining whether the sum exceeds a prediction threshold, and if so establishing the predicted value for the output field.

10. The method of claim 9, further comprising removing weights that fall below a threshold value.

11. The method of claim 1, wherein learning the predictive relationship includes using a predictive learning mechanism that is configured so that only a limited number of prediction errors is made before the predictive relationship is modified, the limited number of prediction errors being limited by a bound that is proportionate to a logarithm of a number of field-value combinations occurring in records in the incoming stream of data records.

12. The method of claim 1, wherein learning the predictive relationship includes using a predictive learning mechanism that multiplicatively updates a set of weights associated with the predictive relationship.

13. The method of claim 1, wherein learning the predictive relationship includes using a predictive learning mechanism that learns from mistaken predictions.

14. The method of claim 1, wherein learning the predictive relationship includes using a predictive learning mechanism that ignores true negative predictions.

15. The method of claim 1, wherein learning the predictive relationship includes sampling a subset of records in the incoming stream of data records in order to learn the predictive relationship.

16. The method of claim 1, further comprising refining the predictive relationship by training a predictive learning mechanism on a saved set of records from the incoming stream of data records.

17. The method of claim 1, wherein receiving the incoming stream of data records includes receiving the incoming stream of data records over a network from at least one process that is generating the data records.

18. The method of claim 1, wherein receiving the incoming stream of data records includes receiving the incoming stream of data records over a network from a plurality of processes that are generating the data records.

19. The method of claim 1, wherein receiving the incoming stream of data records includes receiving the incoming stream of data records from a client computer system.

20. The method of claim 1, wherein receiving the incoming stream of data records includes receiving the incoming stream of data records from an application server computer system.

21. The method of claim 1, wherein receiving the incoming stream of data records includes receiving the incoming stream of data records from a transactional database.

22. The method of claim 1, further comprising using the predicted value to supply a missing data value for the output field.

23. The method of claim 1, further comprising using the predicted value to validate a value in the output field.

24. The method of claim 1, further comprising using the predicted value to predict a trend in the incoming stream of data records.

25. A method for making online predictions about data records from an incoming stream of data records, comprising:

receiving, at a computer system, the incoming stream of data records;

discovering an association rule between fields in the incoming stream of data records in an online manner as the incoming stream of data records is received; and outputting the association rule for viewing by a human decision-maker.

26. A method for making online predictions about data records from an incoming stream of data records, comprising:

receiving, at a computer system, the incoming stream of data records;

learning a predictive relationship in an online manner between fields in a record in the incoming stream of data records as the incoming stream of data records is received;

discovering an association rule between records in the incoming stream of data records in an online manner as the incoming stream of data records is received;

examining at least one value from at least one input field of a first data record in the incoming stream of data records; and creating a predicted value for an output field in the first data record using the at least one value and the predictive relationship.

27. The method of claim 26, further comprising outputting the association rule for viewing by a human decision-maker.

28. A method for making online predictions about data records from an incoming stream of data records, comprising:

receiving, at a computer system, the incoming stream of data records;

learning a predictive relationship between fields in records in the incoming stream of data records in an online manner as the incoming stream of data records is received using a predictive learning mechanism, so that only a limited number of prediction errors is made before the predictive relationship is modified;

discovering an association rule between records in the incoming stream of data records in an online manner as the incoming stream of data records is received, wherein discovering the association rule includes discovering that a first value occurring in a first field is predictive of a second value occurring in a second field in data records in the incoming stream of data records;

removing association rules that make poor predictions;

removing infrequently used association rules;

examining at least one value from at least one input field of a first data record in the incoming stream of data records; and creating a predicted value for an output field in the first data record using the at least one value and the predictive relationship.

29. The method of claim 28, wherein the limited number of prediction errors is limited by a bound that is proportionate to a logarithm of a number of field-value combinations occurring in records in the incoming stream of data records.

30. An apparatus for making predictions about data records from an incoming stream of data records, comprising:

an input, for receiving the incoming stream of data records;

a predictive learning mechanism coupled to the input, that is configured to learn a predictive relationship between fields in records in the incoming stream of data records in an online manner as the incoming stream of data records is received; and a prediction mechanism that is configured to examine at least one value from at least one input field of a first data record in the incoming stream of data records and creates a predicted value for an output field in the first data record using the at least one value and the predictive relationship.

31. The apparatus of claim 30, further comprising a relationship discovering mechanism, for discovering an association rule between records in the incoming stream of data records in an online manner.

32. The apparatus of claim 31, further comprising a mechanism that outputs the association rule for viewing by a human decision-maker.

33. The apparatus of claim 31, wherein the relationship discovering mechanism includes a mechanism that discovers that a first value occurring in a first field is predictive of a second value occurring in a second field in data records in the incoming stream of data records.

34. The apparatus of claim 31, wherein the relationship discovering mechanism includes a mechanism that discovers that a first value occurring in a first field and a second value occurring in a second field is predictive of a third value occurring in a third field in data records in the incoming stream of data records.

35. The apparatus of claim 31, wherein the relationship discovering mechanism is configured to sample a subset of records in the incoming stream of data records in order to discover the association rule.

36. The apparatus of claim 31, wherein the relationship discovering mechanism is configured to remove association rules that make poor predictions.

37. The apparatus of claim 31, wherein the relationship discovering mechanism is configured to remove infrequently used association rules.

38. The apparatus of claim 30, wherein the predictive learning mechanism is configured to sum at least one weight relating the predicted value to the at least one input field value from the at least one input field, and to determine whether the sum exceeds a prediction threshold, and if so to establish the predicted value for the output field.

39. The apparatus of claim 30, wherein the predictive learning mechanism is configured so that only a limited number of prediction errors is made before the predictive relationship is modified, the limited number of prediction errors being limited by a bound that is proportionate to a logarithm of a number of field-value combinations occurring in records in the incoming stream of data records.

40. The apparatus of claim 30, wherein the predictive learning mechanism is configured to multiplicatively update a set of weights associated with the predictive relationship.

41. The apparatus of claim 30, wherein the predictive learning mechanism includes a predictive learning mechanism that learns from mistaken predictions.

42. The apparatus of claim 30, wherein the predictive learning mechanism is configured to ignore true negative predictions.

43. The apparatus of claim 30, wherein the predictive learning mechanism is configured to sample a subset of records in the incoming stream of data records in order to learn the predictive relationship.

44. The apparatus of claim 30, wherein the predictive learning mechanism operates on a saved set of records from the incoming stream of data records when no new records are being received at the input.

45. The apparatus of claim 30, wherein the input is configured to receive the incoming stream of data records from at least one process that is generating the data records.

46. The apparatus of claim 30, wherein the input is configured to receive the incoming stream of data records from a plurality of processes that are generating the data records.

47. The apparatus of claim 30, wherein the input is configured to receive the incoming stream of data records from a client computer system.

48. The apparatus of claim 30, wherein the input is configured to receive the incoming stream of data records from an application server computer system.

49. The apparatus of claim 30, wherein the input is configured to receive the incoming stream of data records from a transactional database.

50. The apparatus of claim 30, further comprising a mechanism that uses the predicted value to predict a missing data value for the output field.

51. The apparatus of claim 30, further comprising a mechanism that uses the predicted value to validate a value in the output field.

52. The apparatus of claim 30, further comprising a mechanism that uses the predicted value to predict a trend in the incoming stream of data records.

53. An apparatus for making predictions about data records from an incoming stream of data records, comprising:
- an input, for receiving the incoming stream of data records;
- a relationship discovering mechanism that discovers an association rule between records in the incoming stream of data records in an online manner;
- a predictive learning mechanism coupled to the input, that learns a predictive relationship in an online manner between fields in records in the incoming stream of data records as the incoming stream of data records is received, wherein the predictive learning mechanism includes a predictive learning mechanism that learns from mistaken predictions; and
- a prediction mechanism that examines at least one value from at least one input field of a first data record in the incoming stream of data records and creates a predicted value for an output field in the first data record using the at least one value and the predictive relationship.

54. An apparatus for making predictions about data records from an incoming stream of data records, comprising:
- an input, for receiving the incoming stream of data records;
- a relationship discovering mechanism that discovers an association rule between records in the incoming stream of data records in an online manner; and
- a mechanism that outputs the association rule for viewing by a human decision-maker.

55. A data entry system that predicts a contents of a field in a first record based upon a contents of at least one other field in the first record, comprising:
- a predictive learning mechanism that learns a predictive relationship in an online manner between fields in records in an incoming stream of records as the incoming stream of records is received;
- a data input mechanism, that receives input into fields in the first record from a user; and
- a prediction mechanism, coupled to the data input mechanism and the predictive learning mechanism, that examines at least one value from at least one input field of the first record and creates a predicted value for an output field in the first record based upon the at least one value and the predictive relationship.

56. The data entry system of claim 55, further comprising a server computer system containing the predictive learning mechanism, the data input mechanism and the prediction mechanism, wherein the data input mechanism receives input from the user through a client computer system that communicates with the server computer system through a network.

57. The data entry system of claim 55, wherein the incoming stream of records originates from the data input mechanism.

58. The data entry system of claim 55, wherein the incoming stream of records originates from a source other than the data input mechanism.

59. The data entry system of claim 55, wherein the data input mechanism receives in put from a plurality of users.

60. The data entry system of claim 55, further comprising a mechanism that uses the predicted value to establish a missing data value for the output field.

61. The data entry system of claim 55, further comprising a mechanism that uses the predicted value to validate a value in the output field.

62. The data entry system of claim 55, further comprising a mechanism that uses the predicted value to predict a trend in the incoming stream of data records.

63. The data entry system of claim 55, further comprising a database system coupled to the data entry system, for storing records entered through the data entry system.

64. The data entry system of claim 55, wherein the predictive learning mechanism is configured so that so that only a limited number of prediction errors is made before the predictive relationship is modified, the limited number of prediction errors being limited by a bound that is proportionate to a logarithm of a number of field-value combinations occurring in records in the incoming stream of data records.

65. The data entry system of claim 55, wherein the predictive learning mechanism includes a mechanism that multiplicatively updates a set of weights associated with the predictive relationship.

66. The data entry system of claim 55, wherein the predictive learning mechanism includes a predictive learning mechanism that learns from mistaken predictions.

67. The data entry system of claim 55, wherein the predictive learning mechanism is configured to ignore true negative predictions.

68. The data entry system of claim 55, wherein the predictive learning mechanism operates on a saved set of records from the incoming stream of data records when no new records are being received at the data input mechanism.

69. The data entry system of claim 55, wherein the data input mechanism is configured to receive the incoming stream of data records from a client computer system.

70. The data entry system of claim 55, wherein the data input mechanism is configured to receive the incoming stream of data records from an application server computer system.

71. The data entry system of claim 55, wherein the data input mechanism is configured to receive the incoming stream of data records from a transactional database.

72. An associative memory, comprising:
- a predictive learning mechanism, for receiving an incoming stream of groups of values, each group of values in the incoming stream comprising a set of associated values including at least one input value and an output value, the predictive learning mechanism learning a predictive relationship in an online manner between the at least one input value and the output value as the incoming stream is received;
- a first input, for receiving the at least one input value from a group of values; and
- a prediction mechanism, coupled to the first input and the predictive learning mechanism, for receiving the at least one input value from the first input and creates a predicted value for the output based upon the at least one input value and the predictive relationship; and
- a first output, coupled to the prediction mechanism, for outputting the predicted for the output.

73. The associative memory of claim 72, further comprising a relationship discovering mechanism, for discovering an association rule between records in the incoming stream of data records in an online manner.

74. The associative memory of claim 73, further comprising a mechanism, for outputting the association rule for viewing by a human decision-maker.

75. The associative memory of claim 72, further comprising:
- a second input, for receiving the output value from the group of values; and a comparison unit, for comparing the output value to the predicted for the output in order to determine whether the second value was predicted correctly.

76. A program storage device storing instructions that when executed by a computer system perform a method for making predictions about data records from an incoming stream of data records, comprising:

receiving, at a computer system, the incoming stream of data records;

learning a predictive relationship in an online manner between fields in records in the incoming stream of data records as the incoming stream of data records is received;

examining at least one value from at least one input field of a first data record in the incoming stream of data records; and creating a predicted value for an output field in the first data record using the at least one value and the predictive relationship.

77. A computer system including an apparatus for making predictions about data records from an incoming stream of data records, comprising:

a processor;

a memory coupled to the processor;

an input coupled to the processor, that receives the incoming stream of data records;

a predictive learning mechanism coupled to the input, that learns a predictive relationship in an online manner between fields in records in the incoming stream of data records as the incoming stream of data records is received; and a prediction mechanism coupled to the input, that examines at least one value from at least one input field of a first data record in the incoming stream of data records and creates a predicted value for an output field in the first data record using the at least one value and the predictive relationship.

* * * * *

UNITED STATES PATENT AND TRADEMARK OFFICE
CERTIFICATE OF CORRECTION

PATENT NO. : 6,078,918
DATED : 6/20/00
INVENTOR(S) : Allen, et al.

It is certified that error appears in the above-identified patent and that said Letters Patent is hereby corrected as shown below:

In the Assignee name, please replace "Trivada" with --Trivida--.

Signed and Sealed this

Third Day of April, 2001

Attest:

NICHOLAS P. GODICI

Attesting Officer

Acting Director of the United States Patent and Trademark Office